(12) United States Patent
Cho (10) Patent No.: US 7,257,197 B2
(45) Date of Patent: Aug. 14, 2007

(54) REFLECTOR RACK, FABRICATION METHOD THEREOF, AND NARROW BRAND X-RAY FILTER AND SYSTEM INCLUDING SAME

(75) Inventor: Yong Min Cho, Silver Spring, MD (US)

(73) Assignee: Monochromatic X-Ray Filter Technologies, Inc., College Park, MD (US)

( * ) Notice: Subject to any disclaimer, the term of this patent is extended or adjusted under 35 U.S.C. 154(b) by 0 days.

(21) Appl. No.: 11/132,305

(22) Filed: May 19, 2005

(65) Prior Publication Data

US 2005/0220271 A1 Oct. 6, 2005

Related U.S. Application Data

(63) Continuation-in-part of application No. 10/857,927, filed on Jun. 2, 2004.

(60) Provisional application No. 60/651,460, filed on Jun. 3, 2003.

(51) Int. Cl.
*G21K 3/00* (2006.01)
*G02B 5/28* (2006.01)
*G02B 5/26* (2006.01)

(52) U.S. Cl. .................... 378/158; 378/159; 359/589

(58) Field of Classification Search ............ 378/16, 378/138, 156, 158, 159; 359/584, 587, 588, 359/589
See application file for complete search history.

(56) References Cited

U.S. PATENT DOCUMENTS 4,519,503 A * 5/1985 Wilson ........................ 206/505

5,016,267 A 5/1991 Wilkins
2003/0128810 A1 10/2003 Verman et al.

OTHER PUBLICATIONS

U.S. Appl. No. 10/857,927, filed Jun. 2004, Cho et al.*
International Search Report for PCT/US04/17131 dated Jan. 17, 2006.
Written Opinion of the International Searching Authority for PCT/US04/17131 dated Jan. 17, 2006.
"Thin film multilayer fan-beam X-ray monochromator," R.J. Harms, P.J. Serlemitsos, and S.M. Owens, *Proceedings of SPIE*, vol. 4501, No. 27, 2001, pp. 193-200.

(Continued)

*Primary Examiner*—Edward J. Glick
*Assistant Examiner*—Anastasia S. Midkiff
(74) *Attorney, Agent, or Firm*—Harness, Dickey & Pierce, P.L.C.

(57) ABSTRACT

A stackable rack may comprise: at least two rails, a cross-section of each rail having a shape resembling a staircase, first step portion of which represents a first surface upon which a reflector can be disposed; and a second step portion of which represents a second surface which can support another rail. A method of making a narrow band x-ray filter may comprise: providing a substrate; and stacking one or more reflection units in succession upon the substrate, each reflection unit including a rack (such as mentioned above) and a reflector held by the rack. An apparatus to produce a substantially narrow band x-ray beam may include such a filter. An apparatus to make an x-ray image of a subject may include: the apparatus to produce a substantially narrow band x-ray beam, e.g., as set forth above, and an x-ray detector arranged to receive the narrow band x-ray.

23 Claims, 6 Drawing Sheets

OTHER PUBLICATIONS

"X-ray monochromator for divergent beam radiography using conventional and laser produced X-ray sources," H.W. Schnopper, S. Romaine, and A. Krol, *Proceedings of SPIE*, vol. 4502, No. 24, 2001, pp. 19-29.

"Masked deposition techniques for achieving multilayer period variations required for short-wavelength (68Å) soft-x-ray imaging optics," J.B. Kortright, E.M. Gullikson, and P.E. Denham, *Applied Optics*, Optical Society of America, vol. 32, No. 34, Dec. 1, 1993, pp. 6961-6968.

"Development of Thermally Formed Glass Optics for Astronomical Hard X-ray Telescopes," W. Craig et al., *Optics Express*, vol. 7, No. 4, Aug. 14, 2000, pp. 178-185.

"Development and production of hard X-ray multilayer optics for HEFT," J.E. Koglin et al., *Proceedings of SPIE*, vol. 4851, 2003, pp. 607-618.

"Development of precision hard X-ray multilayer optics with sub-arcminute performance," J.E. Koglin et al, *Proceedings of SPIE*, vol. 4851, 2003, pp. 673-683.

"Fabrication and Performance of Constellation-X Hard X-ray Telescope Prototype Optics Using Segmented Glass," C.J. Hailey et al., *Proceedings of SPIE*, vol. 5168, 2004, pp. 90-99.

"X-ray and far UV multilayer mirrors: principles and possibilities," A.V. Vinogradov and B. Ya. Zeldovich, *Applied Optics*, vol. 16, No. 1, Jan. 1977, pp. 89-93.

Spiller, Eberhard, *Soft X-ray Optics*, SPIE Optical Engineering Press, Bellingham, 1994, pp. 139-168, also v-viii and 275-278.

PCT International Search Report (PCT Article 18 and Rules 43 and 44) dated Feb. 1, 2007, for corresponding PCT Application No. PCT/US06/19602.

* cited by examiner

FIG. 2C
(see section line IIC-IIC')

FIG. 1C
(see section line IC-IC')

FIG. 2D

FIG. 2A
(top view)

FIG. 2B
(see section line IIB-IIB')

FIG. 2E

(see section line IIE-IIE')

FIG. 2F

(top view)

REFLECTOR RACK, FABRICATION METHOD THEREOF, AND NARROW BRAND X-RAY FILTER AND SYSTEM INCLUDING SAME

PRIORITY INFORMATION

This application claims priority according to 35 U.S.C. §120 upon a non-provisional U.S. patent application Ser. No. 10/857,927 (hereafter, the "copending '927 application"), filed Jun. 2, 2004, which claims priority according to 35 U.S.C. §119(e) upon a provisional U.S. Patent Application having Ser. No. 60/651,460, filed Jun. 3, 2003, the disclosures of the above-identified patent applications being incorporated herein in their respective entireties.

BACKGROUND OF THE PRESENT INVENTION

The copending '927 application discloses, among other things, a multi-mirror x-ray filter having left & right (or upper & lower) frames built up from discrete stacked rails, rather than each frame being formed of one integral component, respectively. For ease of discussion, the frames will be distinguished on the basis, e.g., of a left and right orientation. Each corresponding left & right rail together hold a reflector disposed thereon, with these three components comprising a reflection unit. Such an x-ray filter includes a sheaf of reflection units that can be built by stacking reflection units upon each other.

A reflection unit can be assembled as follows. A set of left and right rails can be disposed on a substrate. Then a first reflector can be disposed on corresponding support surfaces of the set of left and right rails. Additional reflection units can be incrementally assembled in this manner until a sufficient number thereof has been stacked upon each other to define the sheaf.

SUMMARY OF THE PRESENT INVENTION

An embodiment of the present invention provides a stackable rack comprising: at least two rails, a cross-section of each rail having a shape resembling a staircase that includes at least first and second step portions; the first step portion being located relatively upward from an underlying structure on which the rack is disposed; the first step portion representing a first surface upon which a reflector can be disposed; and the second step portion representing a second surface which can support another rail disposable thereon.

An embodiment of the present invention provides a method of making a narrow band x-ray filter, the method comprising: providing a substrate; and stacking one or more reflection units in succession upon the substrate, each reflection unit including a rack and a reflector to be held by the rack. Such a step of stacking, for each reflection unit, may include: disposing the respective rack on a respective underlying structure; and disposing the reflector on the rack. Each such rack may include at least two rails, each of which in cross-section has a shape resembling a staircase that includes at least first and second step portions; the first step portion being located relatively upward from the respective underlying structure on which the rack is disposed; the first step portion representing a first surface upon which the respective reflector is disposed; and the second step portion representing a second surface which can support a rail of another rack disposable thereon.

An embodiment of the present invention provides an apparatus to produce a substantially narrow band x-ray beam. Such an apparatus may include: a filter made according to, e.g., the method set forth above.

An embodiment of the present invention provides an apparatus to make an x-ray image of a subject. Such an apparatus may include: the apparatus to produce a substantially narrow band x-ray beam, e.g., as set forth above, and an x-ray detector arranged to receive the narrow band x-ray beam so that a subject disposed between the second end of the telescope and the detector casts an image thereon.

Additional features and advantages of the present invention will be more fully apparent from the following detailed description of example embodiments, the accompanying drawings and the associated claims.

BRIEF DESCRIPTION OF THE DRAWINGS

The above and other aspects and advantages of the present invention will become more apparent by describing in detail example embodiments thereof with reference to the attached drawings.

DETAILED DESCRIPTION OF THE PRESENT INVENTION

The present invention will be described more fully with reference to the accompanying drawings, in which example embodiments of the present invention are shown. It should be understood, however, that example embodiments of the present invention described herein can be modified in form and detail without departing from the spirit and scope of the present invention. Accordingly, the embodiments described herein are provided by way of example and not of limitation, and the scope of the present invention is not restricted to the particular embodiments described herein.

In particular, the relative thicknesses and positioning of structures or regions may be reduced or exaggerated for clarity. In other words, the figures are not drawn to scale. Further, a structure is considered as being formed "on"

another structure when formed either directly on the referenced structure or formed on other structures overlaying the referenced structure.

Reference number similarities from one figure to the next suggest at least similar components/items. For example, rack 200-$i$ in FIG. 2A is similar, e.g., to rack 100 of FIG. 1A, etc.

In developing embodiments of the present invention, the following observation regarding the Background Art sheaf of reflection units was made, and a path to an alternate construction of a sheaf of reflection units identified. During the assembly of reflection units according to the Background Art, when a given reflector is disposed on the support surfaces of a given set of left and right rails, left and right edge portions of the given reflector are supported. In other words, central regions of the reflector are not supported. As reflection units are stacked, the lack of central region support can lead to variation in the vertical spacing between central regions of adjacent reflectors. Providing support to the respective central regions could facilitate a reduction in the variation of vertical spacing between reflectors in a sheaf, i.e., a stack of reflection units. One or more embodiments of the present invention can provide such central region support for a reflector of a reflector unit.

Figure 1A:
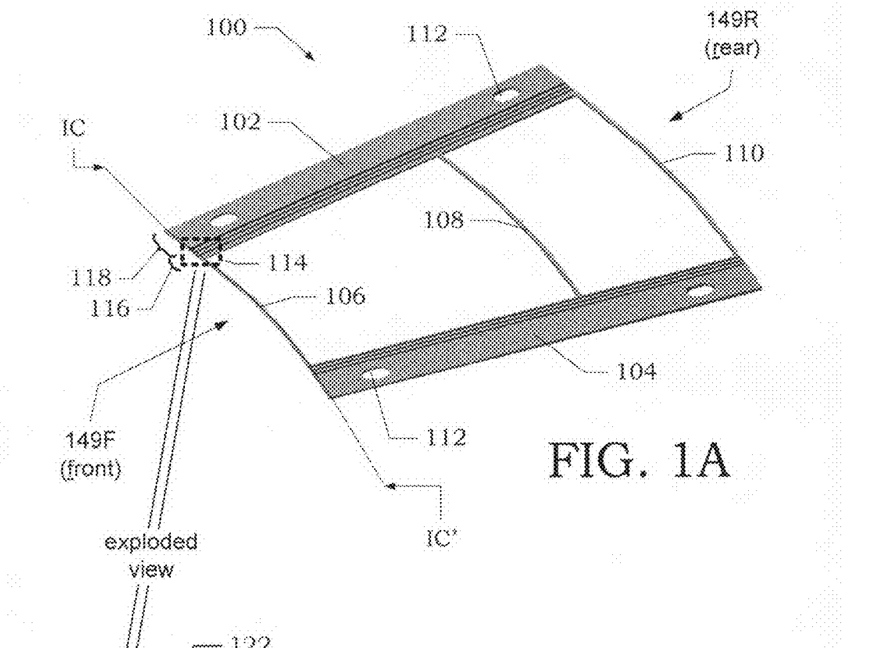
FIG. 1A is a three-quarter perspective diagram of a stackable rack according to an embodiment of the present invention.
Figure 1B:
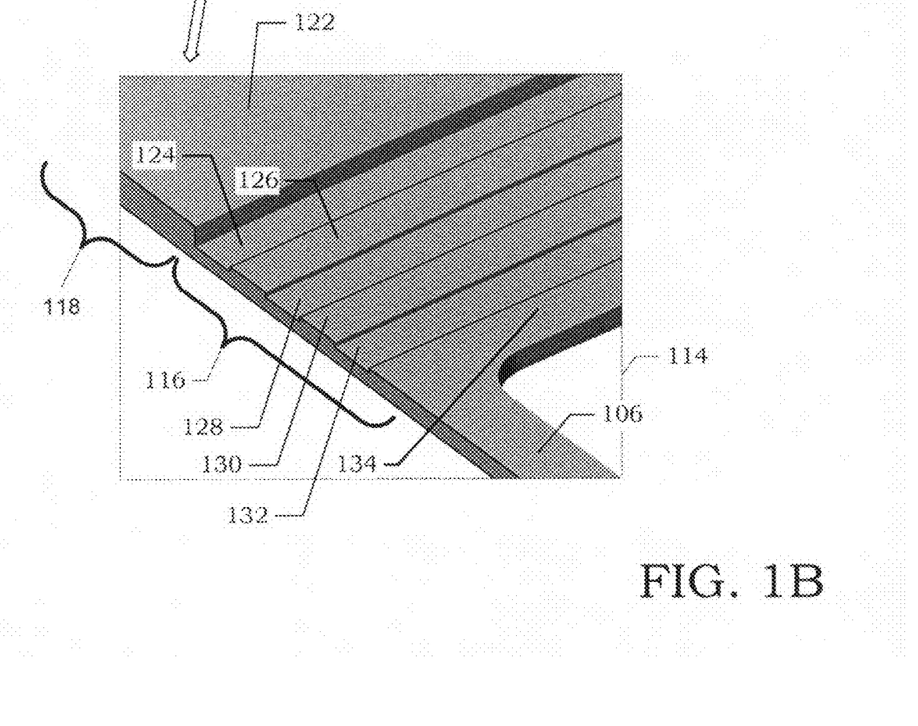
FIG. 1B is an exploded three-quarter perspective view of a region of the rack of FIG. 1A.
Figures 1C, 2C:
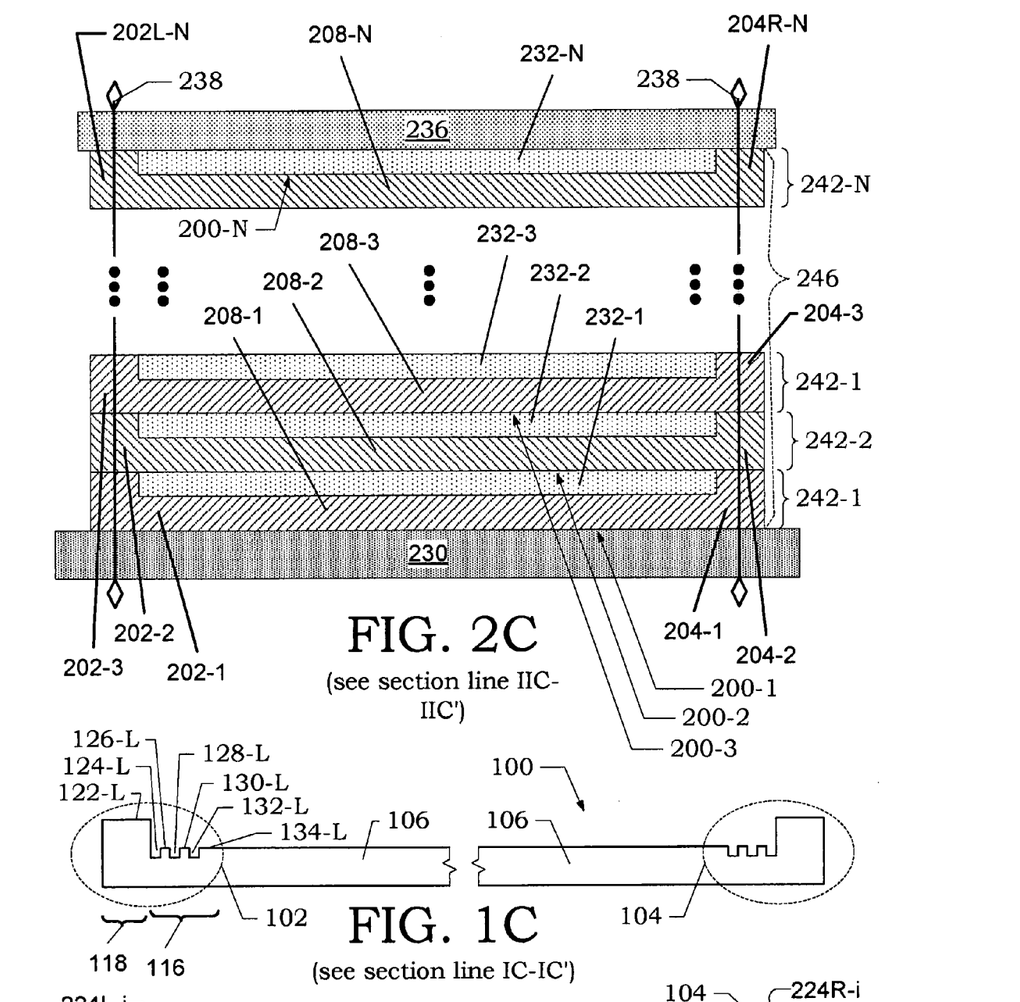
FIG. 1C is a cross-section of the rack of FIG. 1A, taken along a section line IC-IC', where section line IC-IC' passes through a rib.
FIG. 2C is a cross-sectional view of the filter of FIG. 2A taken along section line IIC-IIC' of FIG. 2A.
Figure 2A:
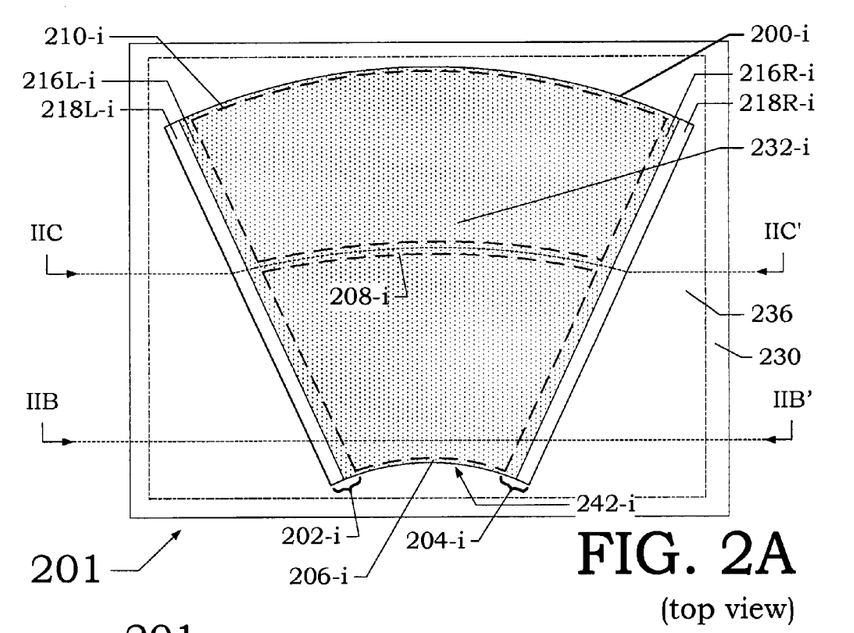
FIG. 2A is a top view of a narrowband x-ray filter according to an embodiment of the present invention.

FIG. 1A is a three-quarter perspective diagram of a stackable rack 100 according to an embodiment of the present invention. FIG. 1B is an exploded view three-quarter perspective of a region 114 of rack 100 of FIG. 1A. FIG. 1C is a cross-section of rack 100, taken along a section line IC-IC' of FIG. 1A, where section line IC-IC' passes through a rib 106.

In FIG. 1A, for the purposes of facilitating a textual description, stackable rack 100 will be assumed to have a front 149F and a rear 149R, and a longitudinal axis extending between front 149F and rear 149R. Stackable rack 100 includes: a left (relative to the front/rear orientation) rail 102; a right (again, relative to the front/rear orientation) rail 104; and ribs 106, 108 and 110 (any two of which can be optional). The disclosed non-zero number of ribs is not limiting, i.e., various other non-zero numbers of ribs are contemplated as alternatives. Each of rails 102 and 104 can include at least one, e.g., two, apertures (e.g., slots) 112, e.g., for receiving respective binding mechanisms 238 (not depicted in FIGS. 1A-1C, but see, e.g., FIGS. 2B-2C). The long axes of rails 102 and 104 can be described as ray segments, where the corresponding rays diverge from a substantially common point of origin.

Each of rails 102 and 104 can be described as having a shape, in cross-section (substantially perpendicular to the longitudinal axis), resembling a staircase that includes at least a first step portion 116 and a second step portion 118. First step portion 116 can include: at least one channel 124 and at least one plateau portion 126; optional channel regions 128 and 132; and optional plateau portions 130 and 134. The disclosed non-zero numbers of channels and plateau portions, respectively, are not limiting, i.e., various respective other non-zero numbers of channels and plateau portions are contemplated as alternatives. Also, while the non-zero numbers of channels and plateau portions on the right side are depicted as being the same as on the left side, respectively, such respective symmetry is not limiting, i.e., respective asymmetry is contemplated as alternatives.

An example of one sample instantiation of rack 100 will be provided, but it is to be kept in mind that the explicit dimensions are not limiting of the invention as other combinations are dimensions are contemplated. Thus, sample reck 100 can have the following specific dimensions. A length of rails 102 end 104 can be about 4.0 inches. A width of first step portion 116 can be about 0.189 inches and a width of second step portion 118 can be about 0.374 inches. An upper surface 122 of each second step portion 118 can extend above a top surface of plateau portions 126, 130 and 134, respectively, by about 0.009 inches. Channels 124, 128 and 132 can be about 0.003 inches deep, i.e., extending about 0.003 inches below top surfaces of plateau portions 126, 130 and 134, respectively. Channels 124, 128 and 132, and plateau portions 126, 130 and 134, can be about 0.031 inches wide, respectively. Ribs 106, 108 and 110 of sample rack 100 each can be about 0.04 inches broad (where breadth should be understood as having a direction passing through the common point of origin). The long axes of rails 102 and 104 can diverge at, i.e., sweep out, an angle of about 15°. A distance between the left side of rail 102 and the right side of rail 104 at front edges thereof, respectively, can be about 3.053 inches. A distance between the left side of rail 102 and the right side of rail 104 at rear edges thereof, respectively, can be about 4.098 inches.

The long axes of channels 124, 128 and 132 also can be described as ray segments, where the corresponding rays diverge from substantially the common point of origin. Similarly, the long axes of plateau portions 126, 130 and 134 also can be described as ray segments, where the corresponding rays diverge from substantially the common point of origin. Channels and plateau regions can be interspersed. For example, plateau portion 126 can be interposed between channels 124 and 128, and plateau portion 130 can be interposed between channels 128 and 132. Alternatively, channels and plateau portions can be oriented so that the longitudinal axes thereof are substantially perpendicular to the long axes of rails 102 and 104, respectively.

An upper surface of plateau portions 126, 130 and 134 can provide at least respective parts of a first surface upon which a reflector (to be discussed in more detail below) can be disposed. Additional parts of the first surface further can be provided by the upper surfaces of ribs 106, 108 and 110. An upper surface of second step portion 118 can provide a second surface which can support another corresponding rail 102 or 104 disposable thereon.

Ribs 106, 108 and 110 can be arcuate and convex relative to front 149F. Other configurations are contemplated, e.g., still arcuate but instead concave, linear instead of arcuate, etc., and a combination of the various configurations.

The silhouette (from a top view perspective) of rack 100 is generally fan-shaped or trapezoidally-shaped (where front 149F points toward the smaller end of the trapezoidal shape). More particularly, the top silhouette of rack 110 in FIG. 1A can be described as an annular segment. Similarly, the side silhouette of rack 100 (which corresponds to the sides of second step portions 218L and 218R in FIG. 2E) can be trapezoidally-shaped.

Continuing the example begun above, sample rack 100, can have the following additional dimensions. A height of second step portions 118 of rails 102 and 104 at front edges thereof, respectively, can be about 0.021 inches. Increasedly tapering toward the rear, a height of second step portions 118 of rails 102 and 104 at rear edges thereof, respectively, can be about 0.035 inches. As noted above, a height of each second step portion 118 above a top surfaces of first step portion 116 remains substantially the same, hence a height of first step portions 116 of rails 102 and 104 at front edges thereof, respectively, can be about 0.012 inches while a height of first step portions 118 of rails 102 and 104 at rear edges thereof, respectively, can be about 0.026 inches.

Rack 100 can be formed of a liquid crystal polymer; or alternatively polyester film, nylon, polyvinyl chloride (PVC), other plastics, or the like.

Figure 2B:
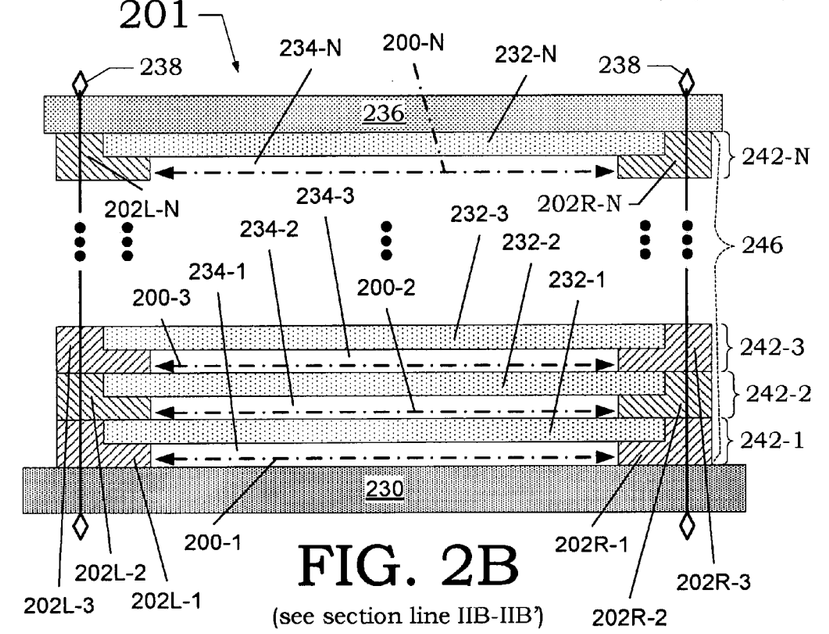
FIG. 2B is a cross-sectional view of the filter of FIG. 2A taken along section line IIB-IIB' of FIG. 2A.
Figure 2D:
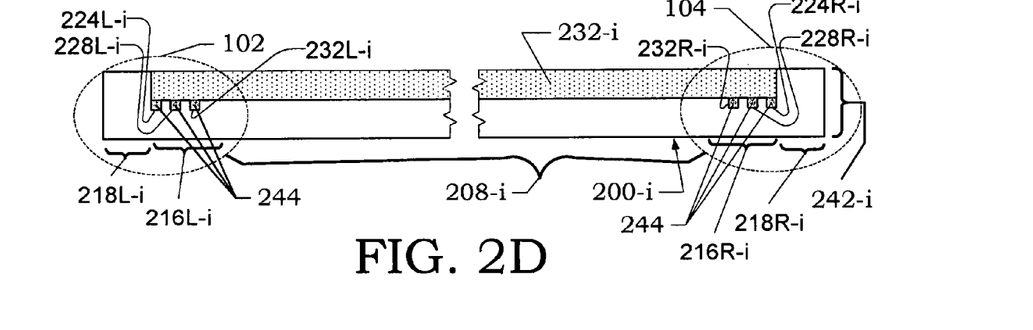
FIG. 2D is a cross-section of any of the reflection units in the filter of FIG. 2C.
Figure 2E:
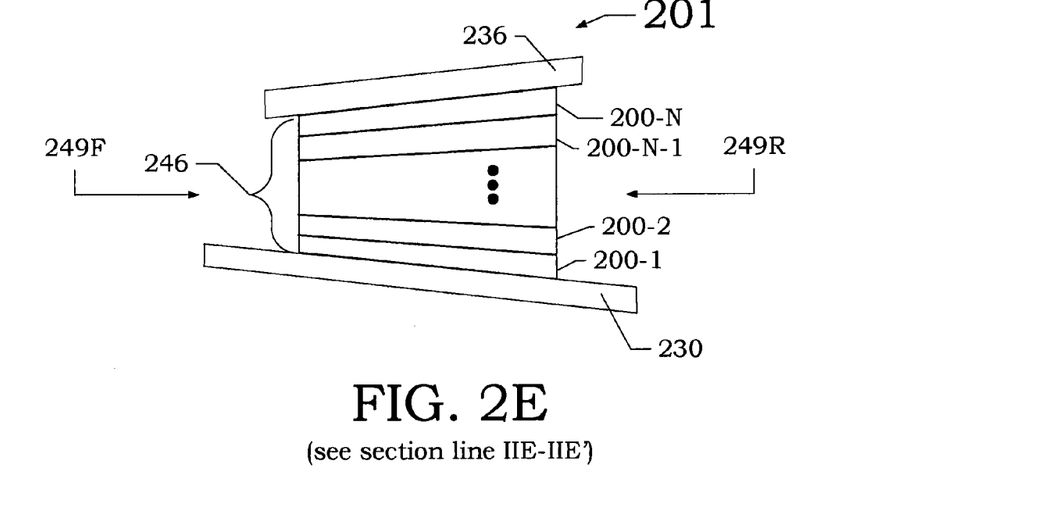
FIG. 2E is a cross-section taken along a section line IIE-IIE' of FIG. 2F.
Figure 2F:
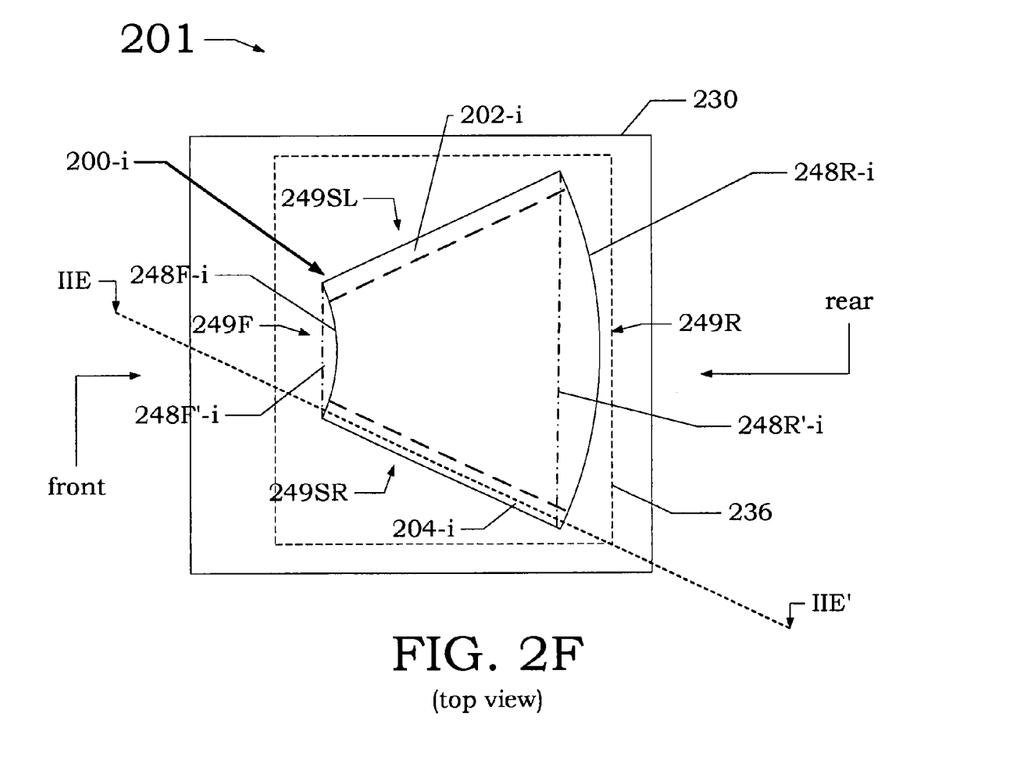
FIG. 2F is an alternate top view of filter 201, rotated 90° clockwise relative to FIG. 2A.

FIG. 2A is a top view of a narrowband x-ray filter 201 according to an embodiment of the present invention. FIG. 2B is a cross-sectional view of filter 201 taken along section line IIB-IIB' of FIG. 2A. FIG. 2C is a cross-sectional view of the filter 201 taken along section line IIC-IIC' of FIG. 2A. FIG. 2D is a cross-section of any of reflection units 242-$i$ in filter 201 of FIG. 2C. FIG. 2E is a cross-section taken along a section line IIE-IIE' of FIG. 2F. FIG. 2F is an alternative top view of filter 201, rotated 90° clockwise relative to FIG. 2A.

In FIG. 2A, there is a sheaf (not called out specifically in FIG. 2A, but see item 246 in, e.g., FIGS. 2B-2C) of reflection units 242-$i$ that can be sandwiched between a base 230 and a top member 236. In FIGS. 2D and 2A, a reflection unit 242-$i$ can include a reflector 232-$i$ and a rack 200-$i$ (e.g., corresponding to rack 100 of FIG. 1). Rack 200-$i$ can include: rails 202-$i$ and 204-$i$ having first step portions 216L-$i$ & 216R-$i$ and second step portions 218L-$i$ and 218R-$i$, respectively; and ribs 206-$i$, 208-$i$ (not called out specifically in FIG. 2B but see FIG. 2A) and 210-$i$ (not called out specifically in FIG. 2B but see FIG. 2A) of which any two are optional. Sides of reflector 232-$i$ can be adjacent to or abut sides of second step portions 218L-$i$ and 218R-$i$. In FIG. 2A, left and right peripheral regions of reflector 232-$i$ are depicted as overlying first step portions 116L-$i$ and 116R-$i$ of rails 202-$i$ and 204-$i$, respectively, and ribs 206-$i$, 208-$i$ and 210-$i$.

Optionally, reflector 232-$i$ can be attached to rack 200-$i$, e.g., via an adhesive 244 disposed in channels 224L-$i$, 228L-$i$ & 232L-$i$ (corresponding to channels 124L, 128L & 132-L, respectively, in FIG. 1C) and 224R-$i$, 228R-$i$ & 232R-$i$. A suitable adhesive, for example, can be one of the repositionable types of adhesive, e.g., a pressure-sensitive, microspheric, polymeric acrylate. Alternatively, the adhesive can be an ultraviolet light curable adhesive, etc.

The silhouette of reflector 232-$i$ in FIGS. 2A and 2F (again, top views) also is generally fan-shaped or trapezoidally-shaped (again, with the smaller end of the trapezoid being located near a front end of rack 200-$i$). More particularly, the top silhouette of reflector 232-$i$ in FIG. 2A can be described as an annular segment. Left and right sides 249SL and 249SR can be described as ray segments. As seen in FIG. 2F, a front surface 24SF-$i$ and a rear surface 248R-$i$ of rack 200-$i$ can be substantially circular arc-segments, respectively, where front surface 248F-$i$ represents a smaller arc-segment than back surface 248R-$i$. As an alternative, front surface 24SF-$i$ and back surface 248R-$i$ can be configured as substantially planar surfaces, which is indicated by dashed straight lines 248F'-$i$ and 248R'-$i$. respectively.

As seen in FIG. 2E, a first rack 200-1 is disposed on base 230. A second rack 200-2 is disposed on the first rack 200-1. Such a stacking of racks 200-$i$ is continued until a rack 200-N is disposed upon a rack 200-N−1. Then top member 236 is disposed on rack 200-N. Overall, the side silhouette of sheaf 246 (as viewed from front 249F to rear 249R in FIG. 2E) is fan-shaped or trapezoidally-shaped (with the smaller end of the trapezoid corresponding to front 249F and the bigger end corresponding to rear 249R). Similarly, the side silhouette of each rack 200-$i$ (which corresponds to the side of second step portion 218R-$i$ in FIG. 2E) can be trapezoidally-shaped in a similar manner to the silhouette of sheaf 246, although the taper of each rack 200-$i$ is not as great as the taper of sheaf 246. In other words, the upper and lower surfaces of step portion 218R-$i$ of rack 200-$i$ are less divergent than the upper and lower surfaces of sheaf 246. In contrast, base 230 and top member 236 can have parallel, or substantially parallel, upper and lower surfaces.

In FIG. 2B, which again is a cross-sectional view of filter 201 taken along sectional line IIB-IIB' of FIG. 2A, a rack 200-1 is disposed on base 230. A reflector 232-1 is disposed on rack 200-1 to define a reflection unit 242-1, and to define a void 234-1. Void 234-1 is bounded by reflector 232-1, rails 202-1 and 204-1, and base 230. With the exception of reflection unit 242-N, the underlying structure for a reflection unit 242-$i$ will be a reflector 230-$i$−1. For reflection unit 242-1, the underlying structure (again) is base 230.

Rack 200-2 is disposed on rack 200-1. More specifically, bottom surfaces of second step portions 218L-2 and 218R-2 of rack 200-2 are disposed on top surfaces of second step portions 218L-1 and 218R-1, respectively. Typically, a reflector 232-$i$ is not a structural element and thus may not be able to withstand significant compression without suffering damage. If so, then (accordingly) a height of the upper surface of second step portions 218L-$i$ and 218R-$i$ can be extended above the height of the upper surfaces of first step portions 216L-$i$ and 216R-$i$, and upper surfaces of ribs 206-$i$, 208-$i$ and 210-$i$ by a delta amount sufficient to at least reduce (if not eliminate) compression of reflector 232-$i$ between rack 200-$i$ and 200-$i$+1. But the delta amount should not be so large as to introduce an amount of slop into the fit such that reflector 232-$i$ can be easily damaged due to the capacity for motion relative to rack 200-$i$ and/or rack 200-$i$+1.

FIG. 2C, again, is a cross-sectional view of the filter 201 taken along section line IIC-IIC' of FIG. 2A. As such, FIG. 2C does not depict voids 234-$i$ as in FIG. 2B. Instead, FIG. 2C depicts ribs 208-1, 208-2, 208-3, . . . , 208-N.

In FIG. 2A, a total of N reflection units 242-$i$ are shown. Top member 236 is disposed on reflection unit 242-N, e.g., to impart rigidity to filter 110 as a whole. Any number of reflection units 242-$i$ can be stacked together, e.g., 2-300. To improve mechanical stability of sheaf 246 (i.e., the stack of reflection units 242-$i$), binding mechanisms 238 can be arranged at the side edges of filter 201 to prevent reflection units 242-$i$ from becoming unstacked and/or misaligned.

Binding mechanism 238 can take a variety of forms. For example, binding mechanism 238 can be a nut & bolt arrangement that compresses top member 236 and base 230 towards each other, which compresses intervening racks 200-1 through 200-N together. For example, binding mechanisms 238 can pass through apertures (e.g., slots) 112 in racks 200-$i$, in that circumstance, binding mechanisms 238 can also function to align reflection units 242-$i$. A similar effect can be achieved, e.g., where binding mechanism 238 takes the form of a damp assembly that clamps against top member 236 and base 230, etc., or a screw having a head the bears against top member 236 and threads that bite into base 230 or vice-versa. Furthermore, a similar effect can be obtained by binding base 230, racks 200-$i$ and top member 236 respectively together with an adhesive. In the nut & bolt, screw and some forms of the clamp approach, a hole is formed in top member 236 (at least partially depending upon the approach) and base 230 (similarly, at least partially depending upon the approach).

Figure 3:
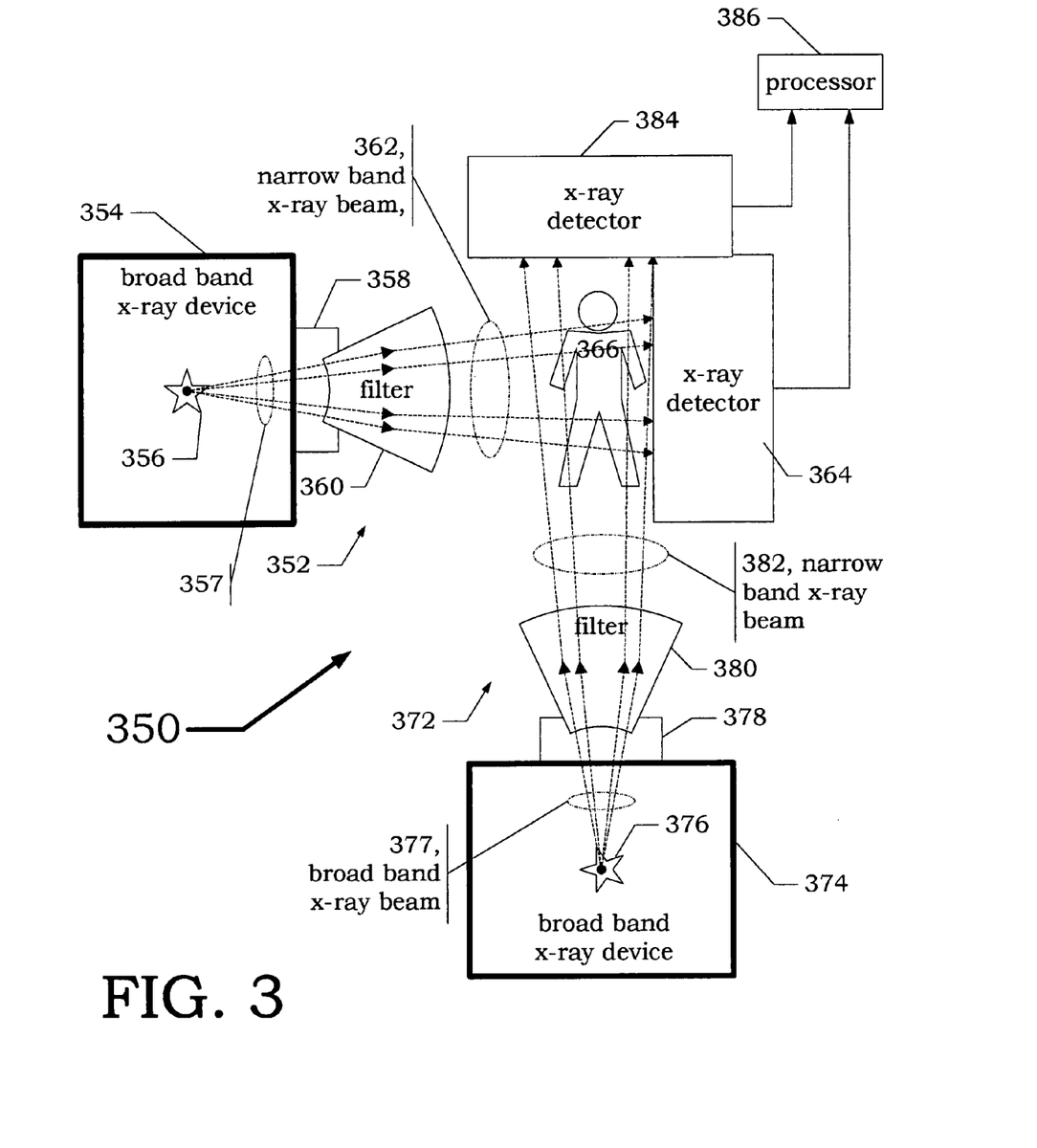
FIG. 3 is a block diagram of an x-ray radiology system according to an embodiment of the present invention.

FIG. 3 is a block diagram of an x-ray radiology system 350 according to an embodiment of the present invention.

In FIG. 3, system 350 includes: a source 354 of a broad band beam 357 of x-rays that itself includes an anode 356 from which the broad band x-ray beam 357 is emitted; a narrow band x-ray filter 360; an alignment mechanism 358; and an x-ray detector 364. Filter 360 can correspond, e.g., to filter 201.

As used herein, the term "narrow band x-ray beam" is to be understood as at least a quasi-mono-energetic, spatially extended beam of x-rays, if not a substantially mono-energetic beam of x-rays.

Construction of alignment mechanism 358 is discussed below. Source 354 and detector 364 are known. For example, source 354 can be the x-ray emitting portion of a known x-ray radiology device. Similarly, for example, detector 364 can be either known x-ray film or an x-ray-to-charge converter, e.g., a charge-coupled display (CCD). In the latter case of a CCD, a processor 386 would be included to harvest and process data from CCD 364 in a known manner to form an x-ray image.

Passage of broad band beam 357 through narrow band filter 360 produces a narrow band beam 362 of x-rays. Relative to anode 356, alignment mechanism 358 moves filter 360 in at least one and up to three degrees of freedom. Alignment mechanism 358 can be constructed, and can operate, very similarly to a lens of a camera. In a camera, the optical elements are adjusted (either manually or via one or more motors) in typically one dimension to move the focal point of the lens (via movement of the lens) onto a photographic film surface or the surface of a solid-state imager that (relative to the movable lens) has a fixed position in space. In system 350, alignment mechanism 358 is used to precisely align a focal point of filter 360 onto anode 356 in 1-3 dimensions. In other words, anode 356 has a fixed location in space relative to filter 360, which is movable via alignment mechanism 358.

In FIG. 3, a subject 366 of the x-ray radiology, e.g., a living organism such as a person, is interposed between filter 360 and detector 364 so that narrow band x-ray beam 362 impinges on subject 366. Varying attenuation of narrow band x-ray beam 362 by different parts of subject 366 casts an x-ray shadow of varying intensities onto detector 364, which detector 364 converts into an image of subject 366. Alternatively, subject 366 can be some other genus and species of living organism, or an inanimate object, e.g., a package, a piece of luggage, etc.

The x-rays, in FIG. 3, that comprise narrow band beam 362 diverge away from filter 360. Such divergence causes a shadow cast by subject 366 to be magnified. To reduce such magnification (and therefore improve the accuracy of the resulting image), subject 366 should be positioned as closely to detector 364 as possible.

In FIG. 3, item nos. 354-364 and 386 can be considered a subsystem 352. A variation of system 350 can include an optional second subsystem 372 that corresponds to subsystem 352 and has optional similar components 374-384, respectively. Subsystem 372 is arranged orthogonally to subsystem 352, which can reduce or eliminate the need to change the position of the subject 366 otherwise associated with using only subsystem 352.

FIGS. 4A-4D are cross-sectional views (from substantially the same perspective as FIG. 2C) that depict a method, according to an embodiment of the present invention, of constructing a narrow band x-ray filter, e.g., filter 201. The method of FIGS. 4A-4D incrementally builds up sheaf 246 of reflection units 242-i, e.g., from discrete racks 201-i.

Figure 4A:
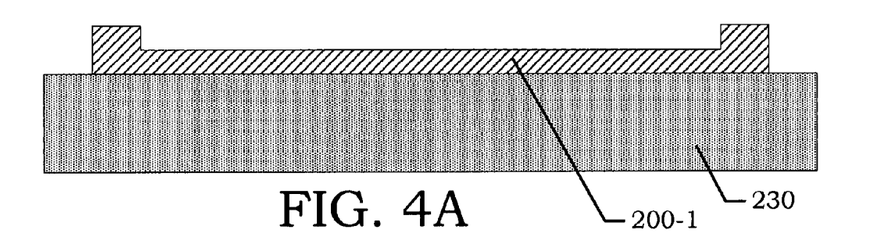
FIGS. 4A-4D are cross-sectional views (from substantially the same perspective as FIG. 2C) that depict a method, according to an embodiment of the present invention, of constructing a narrow band x-ray filter.
Figure 4B:
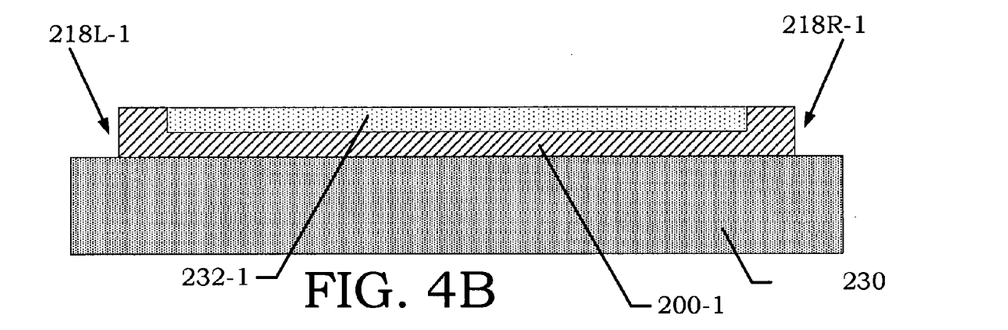

In FIG. 4A, base 230 is provided and then a first rack 200-1 is disposed thereon. In FIG. 4B, a first reflector 232-1 is disposed on rack 200-1. The result is the completion of first reflection unit 242-1 (not called out in FIG. 4B, but see FIG. 2C). It is noted that the use of optional adhesive 244 (see FIG. 2D) is not discussed here, for the sake of simplifying the discussion.

Figure 4C:
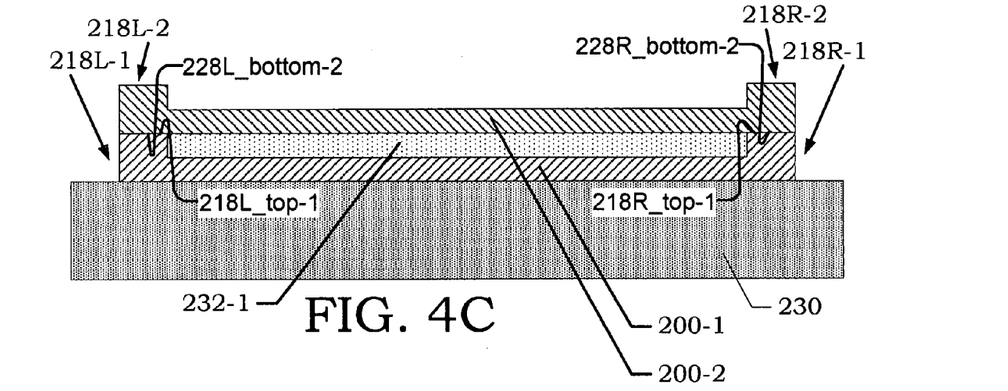

In FIG. 4C, a rack 200-2 is disposed on rack 200-1. More particularly, bottom surfaces 218L_bottom-2 and 218R_bottom-2 of second step portions 218L-2 and 218R-2 of rack 200-2 are disposed on top surfaces 218L_top-1 and 218R_top-1 of second step portions 218L-1 and 218R-1, respectively.

Figure 4D:
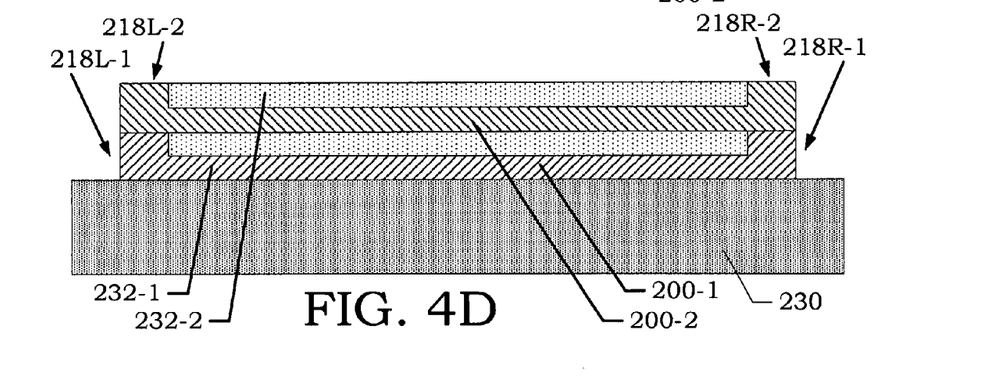

In FIG. 4D, a second reflector 232-2 is disposed on rack 200-2. The result is the completion of second reflection unit 242-2 (not called out in FIG. 4B, but see FIG. 2C). Such stacking would continue until reflection unit 242-N is disposed on reflection unit 242-N−1. Then, top member 236 would be disposed on reflection unit 242-N.

Embodiments of the present invention having been thus described, it will be obvious that the same may be varied in many ways. Such variations are not to be regarded as a departure from the spirit and scope of the present invention, and all such modifications are intended to be included within the scope of the present invention.

What is claimed is:

1. A stackable reflection assembly comprising:
   at least two rails; and
   a reflector;
   a cross-section of each rail including at least first and second step portions, each said cross-section being taken perpendicular to a longitudinal axis of the corresponding rail, each of said at least two rails having a first end and a second end spaced apart along the longitudinal axis of the corresponding rail;
   the first step portions of said at least two rails including first mounting surfaces upon which the reflector is disposed;
   the second step portions of said at least two rails including second mounting surfaces; and
   said at least two rails being spaced apart and oriented with respect to each other so that the longitudinal axes thereof intersect.

2. The assembly of claim 1, wherein:
   the first step portion includes at least one channel portion and at least one plateau portion;
   the at least one plateau portion defining at least a part of the first surface; and
   the at least one channel portion representing a recess that can receive an adhesive by which the reflector can be adhered to the respective rail.

3. The assembly of claim 2, wherein:
   each channel has a longitudinal axis that is substantially parallel to the longitudinal axis of the respective rail.

4. The assembly of claim 2, wherein each first step portion includes two or more ones of the at least one channel portions.

5. The assembly of claim 4, wherein:
   each first step portion includes two or more of the at least one plateau portions;
   a first one of the channel portions is adjacent the second step portion;
   a first one of the plateau portions is adjacent the first channel;
   a second one of the channel portions is adjacent the first plateau portion such that the first plateau portion is interposed between the first and second channel portions.

6. The assembly of claim 1, wherein at least one of the following is true:
   a height of the first step portion corresponds to a height of a void formable between the underlying structure on which the assembly is disposable and an reflector; and a height of the second step portion corresponds to a thickness of the reflector.

7. The assembly of claim 1, further comprising:
at least one rib connecting a first one of the at least two rails to a second one of the at least two rails.

8. The assembly of claim 7, wherein the at least two rails and the at least one rib together are of monolithic construction.

9. A stackable reflection assembly comprising:
at least two rails; and
a reflector;
a cross-section of each rail including at least first and second step portions, each said cross-section being taken perpendicular to a longitudinal axis of the corresponding rail;
the first step portions of said at least two rails including first mounting surfaces upon which the reflector is disposed;
the second step portions of said at least two rails including second mounting surfaces;
at least one rib connecting a first one of the at least two rails to a second one of the at least two rails; and
wherein the at least one rib is of a thickness substantially the same as the thickness of the first step portions such that, when the reflector is disposed on the respective first step portions, the reflector is also disposed on the at least one rib.

10. The assembly of claim 7, further comprising:
two or more ones of the at least one rib;
a first one of the ribs being disposed to connect corresponding first ends of the first and second rails; and
a second one of the ribs being disposed to connect corresponding second ends of the first and second rails, the first and second ribs establishing a substantially fixed, divergent relationship between the first and second rails.

11. The assembly of claim 10, further comprising:
a third rib, interposed between the first and second ribs, and disposed to connect the first and second rails.

12. The assembly of claim 7, wherein the at least one rib is arcuate.

13. A stackable assembly comprising:
at least two rails; and
a reflector;
a cross-section of each rail including at least first and second step portions, each said cross-section being taken perpendicular to a longitudinal axis of the corresponding rail, each of said at least two rails having a first end and a second end spaced apart along the longitudinal axis of the corresponding rail;
the first step portions of said at least two rails including first mounting surfaces upon which the reflector is disposed;
the second step portions of said at least two rails including second mounting surfaces;
at least one rib connecting a first one of the at least two rails to a second one of the at least two rails; and
wherein, for each rail, the following is true,
a thickness of the second step portion is substantially uniform from the first end, along the longitudinal axis, to the second end thereof, and
a thickness of the first step portion increases in magnitude, along the longitudinal axis, from a first thickness at the first end to the second thickness at the second end thereof such that a combined thickness of the first and second step portions increases from the first end to the second end.

14. The assembly of claim 1, wherein the at least two rails together are of monolithic construction.

15. A narrow band x-ray filter comprising:
a substrate; and
a sheaf of one or more reflection units stacked upon each other on the substrate, each reflection unit including a rack and a reflector held by the rack;
each rack including at least two rails, a cross-section of each rail including at least first and second step portions, each said cross-section being taken perpendicular to a longitudinal axis of the corresponding rail, each of said at least two rails having a first end and a second end spaced apart along the longitudinal axis of the corresponding rail;
each first step portion including a first mounting surface upon which the respective reflector is disposed;
each second step portion including a second mounting surface; and
said at least two rails of each rack being spaced apart and oriented with respect to each other so that the longitudinal axes thereof intersect.

16. The filter of claim 1, wherein each reflector includes:
a base layer; and
a stack of one or more mirrors, each mirror including
a heavy Z metal layer, and
a layer of carbon on the metal layer.

17. The filter of claim 16, wherein the heavy Z metal includes at least one of gold, platinum and iridium.

18. The filter of claim 16, wherein each stack includes 2-200 mirrors.

19. The filter of claim 15, wherein the filter further includes a top member on the sheaf.

20. The filter of claim 15, wherein the sheaf includes between 2 and 300 reflection units.

21. An apparatus, to produce a substantially narrow band x-ray beam, comprising:
a source of a first x-ray beam; and
a narrow band x-ray filter, as in claim 15, having a first end, a second end and a focal point located nearer to the first end than to the second end,
the source being disposed substantially at the focal point such that a substantially narrow band x-ray beam emanates from the second end of the filter, and
a cross-section of the narrow band x-ray beam corresponding to at least a majority of the cross-section of the first x-ray beam.

22. A method of making a narrow band x-ray filter, the method comprising:
providing a substrate; and
stacking one or more reflection units in succession upon the substrate, each reflection unit including a rack and a reflector to be held by the rack;
the step of stacking, for each reflection unit, including the following,
disposing the respective rack on a respective underlying structure, and
disposing the reflector on the rack;
each rack including at least two rails, in cross-section each rail including at least first and second step portions, each said cross-section being taken perpendicular to a longitudinal axis of the corresponding rail, each of said at least two rails having a first end and a second end spaced apart along the longitudinal axis of the corresponding rail;
each first step portion including a first mounting surface upon which the respective reflector is disposed;

each second step portion including a second mounting surface which can support a rail of another rack disposable thereon; and said at least two rails of each rack being spaced apart and oriented with respect to each other so that the longitudinal axes thereof intersect.

23. The method of claim 22, further comprising:

mechanically connecting the one or more successively-stacked reflection units to the substrate so as to form a sheaf of reflection units.

* * * * *